INVENTORS
LYLE E. HARRISON
LEON J. SCHAFER
BY

United States Patent Office 3,318,037
Patented May 9, 1967

3,318,037
FLEXIBLE SINKER
Lyle E. Harrison, 724 Dundee Way, Stockton, Calif. 95207, and Leon John Schafer, Stockton, Calif.; said Shafer assignor to said Harrison
Filed Jan. 4, 1965, Ser. No. 423,110
2 Claims. (Cl. 43—42.72)

This invention relates to a fishing apparatus and more particularly to a flexible sinker used with fishing tackle.

It is an object of the present invention to provide a device for weighting a fish line in a simple and efficient manner, which can be readily attached and adapted to various types of fishing gear.

Another object of the present invention is to provide a flexible sinker that is snag and foul resistant when used in conjunction with spin casting, fly fishing, and trolling.

Another object of the present invention is to provide a flexible sinker, that, when attached to a conventional fish line, will absorb the shock as a fish strikes.

Still a further object of the present invention is to provide a flexible sinker which can be produced, packaged, and sold in large quantities at a comparatively low cost, and which can be conveniently utilized wherever needed.

Still additional objects, benefits, and advantages of this invention will become evident from a study of the following detailed description taken in conjunction with the accompanying drawing, in which.

Figure 1:
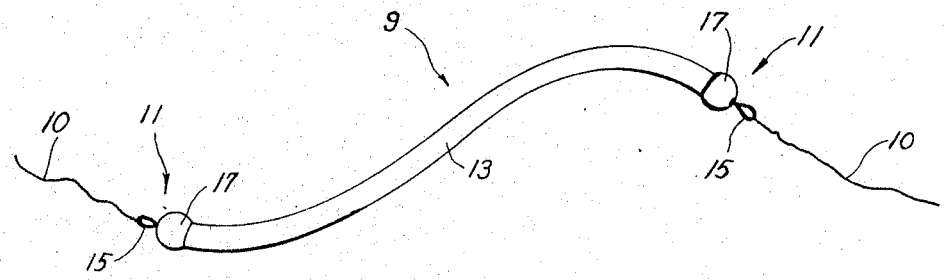
FIGURE 1 is a perspective view of a flexible sinker made in accordance with the present invention.
Figure 2:
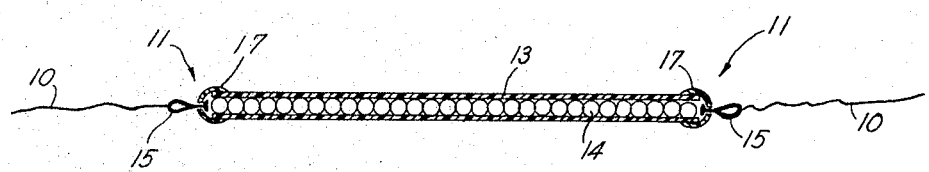
FIGURE 2 is a longitudinal cross section of FIGURE 1, showing the interior of the device.

Referring now specifically to the drawing, a flexible sinker 9 made in accordance with the present invention is shown to include a hollow tube 13 containing lead shot 14 enclosed at each end by a swivel 11. The numeral 9 generally designates the flexible sinker comprising the present invention, which is connected to conventional parts used in various types of fishing.

A fish line 10 is connected to each swivel 11 forming one continuous line between the fishing pole 19 and bait 18.

The swivel 11 is a conventional type used by the fishing tackle industry having a barrel 17 and an eyelet 15. The barrel or head 17 of the swivel 11 is affixed to the hollow tube 13 and the fish line 10 is connected to the eyelet 15. This type of swivel 11 may be adapted for attachment to the hollow tube 13 by those experienced in manufacturing fishing tackle.

The lead shot 14 used for weighting this apparatus can be any lead or an alloy of lead that will provide the appropriate weight for various types of fishing. The lead shot 14 used by the shotgun manufacturers has been found to be satisfactory.

The hollow tube 13, as referred to in this specification, is used to define a woven or flexible tubing, preferably a plastic material, having resilient qualities to recover from the impact of a fish striking a common fish line 10.

The operation of this device will now be readily understood. Attaching the flexible sinker 9 on the fish line by the swivel 11, as commonly done by fishermen, will provide an evenly weighted fish line 10. The flexible sinker 9 will be snag and foul resistant due to its flexible nature and distributed weight and its small diameter. As a fish strikes the bait 18, the shock will be absorbed by the resilience of the hollow tube 13. Since the flexible sinker is a weighted part of the fish line, it will not tumble and twist the fish line 10 in the water 16 or while dragging on the stream bottom 12, which is a common fishing problem. This device is adaptable to many types of fishing as tested in actual use.

Figure 4:
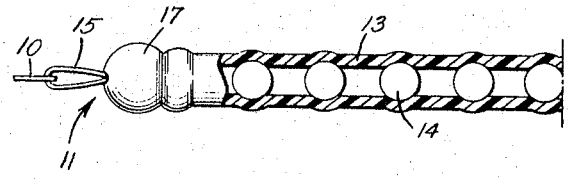
FIGURE 4 is a fragmentary enlarged elevation of the sinker, partly in section, showing a modified arrangement of the lead shot in the tube.
Figure 3:
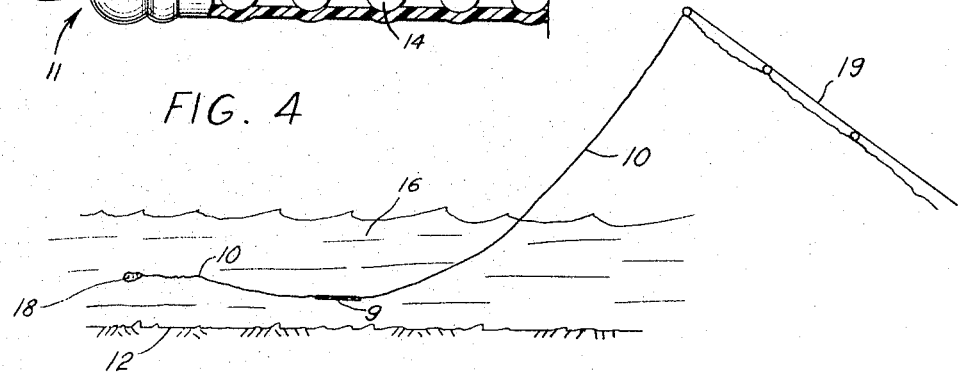
FIGURE 3 is a pictorial view showing the device in actual use.

The tube 13 is of flexible and somewhat stretchable material, as indicated, and if desired the bore of the tube may be of a somewhat smaller initial diameter than that of the lead shot 14. By reason of such relative diameters, the shot may be press-fitted or frictionally engaged in the bore of the tube, and may thus be maintained in whatever spaced relation to each other that may be desired. This relationship is illustrated in FIG. 4. By so doing, the flexibility of the sinker as a whole will be increased over what is the case when the shot are all substantially in contact with each other.

While this invention has been described with particular reference to the construction shown in the drawing and while various changes may be made in the detailed construction, it shall be understood that such changes shall be within the spirit and scope of the present invention as defined by the appended claims.

Having thus completely and fully described the invention, what is now claimed as new and desired to be protected by Letters Patent of the United States is:

1. A flexible sinker suitable for weighting a fish line comprising in combination a tube having a longitudinal bore containing lead shot, a swivel substantially fixed to each end of the tube for retaining the lead shot within the bore, said fish line being separately connectible to each such swivel at the opposite ends of the tube; said bore being of substantially smaller diameter than that of the lead shot for frictionally supporting said shot in a spaced relationship.

2. A sinker for weighting a fish line comprising a tube of flexible and yieldable material having a longitudinal bore, swivels mounted on the ends of the tube and adapted for separate connection to a fish line, and a plurality of separate weight elements press-fitted into the bore in spaced relation to each other along the bore.

References Cited by the Examiner

UNITED STATES PATENTS

| | | | |
|---|---|---|---|
| 77,774 | 5/1868 | Smith | 43—43.14 |
| 2,600,002 | 6/1952 | Klein | 43—43.14 |
| 2,749,650 | 6/1956 | Rees | 43—43.12 |
| 2,754,614 | 7/1956 | Yakel | 43—43.12 |
| 3,158,953 | 12/1964 | Filler | 43—43.14 |

SAMUEL KOREN, Primary Examiner.

D. J. LEACH, Assistant Examiner.